July 18, 1939. A. L. KRONQUEST 2,166,598
APPARATUS FOR SOLDERING AND COATING SIDE SEAMS OF SHEET METAL CONTAINERS
Filed July 12, 1937 3 Sheets-Sheet 1
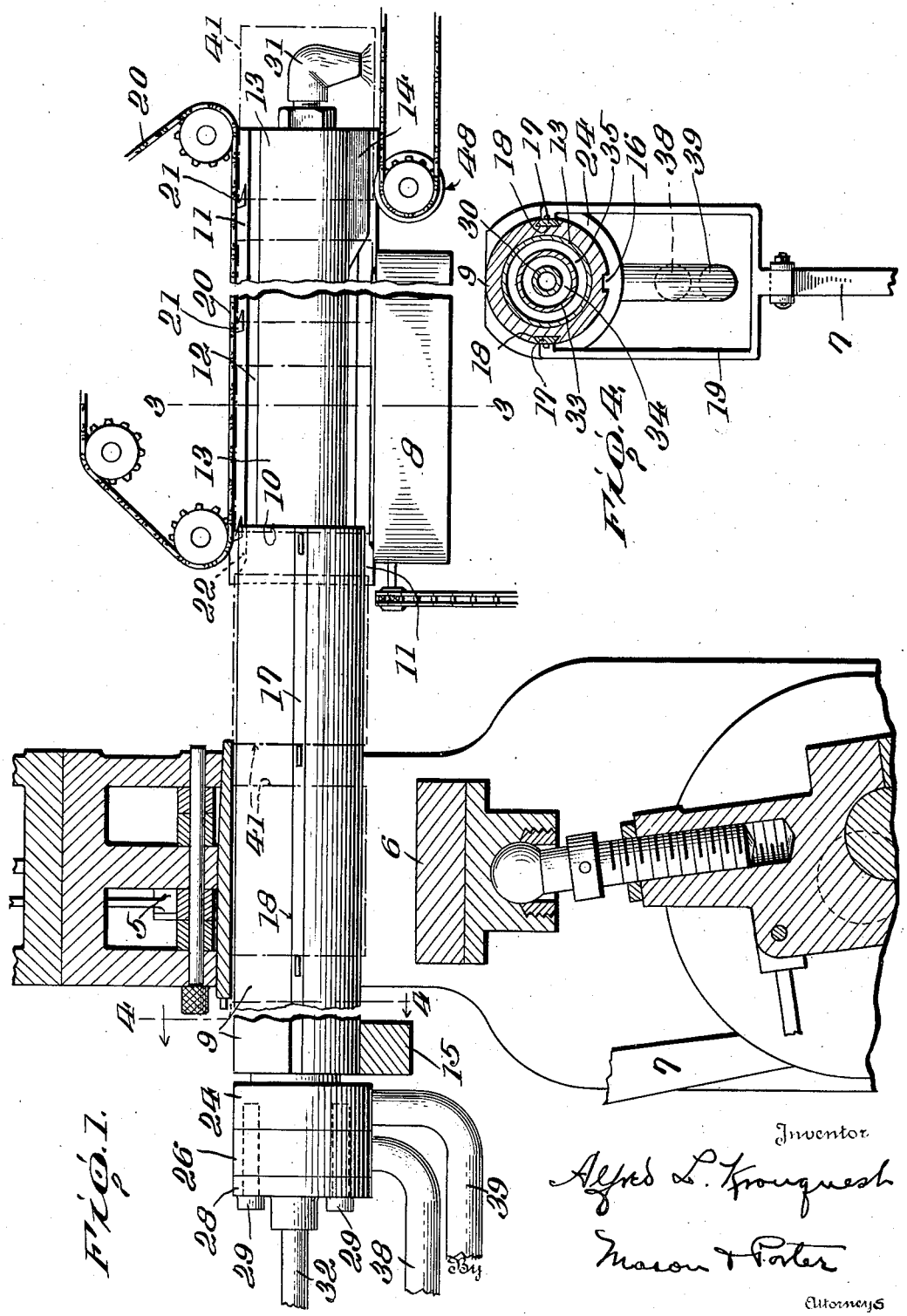

July 18, 1939. A. L. KRONQUEST 2,166,598
APPARATUS FOR SOLDERING AND COATING SIDE SEAMS OF SHEET METAL CONTAINERS
Filed July 12, 1937 3 Sheets-Sheet 2
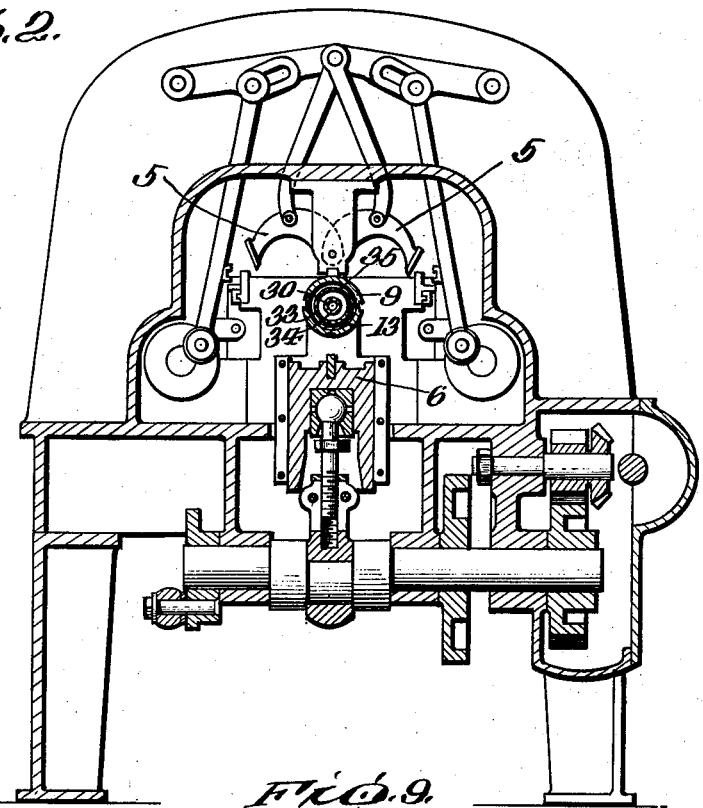
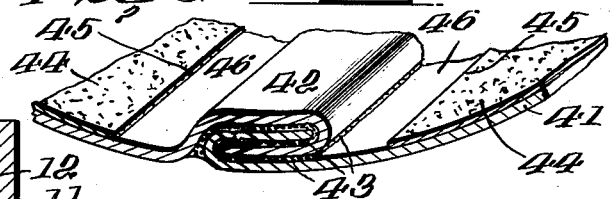
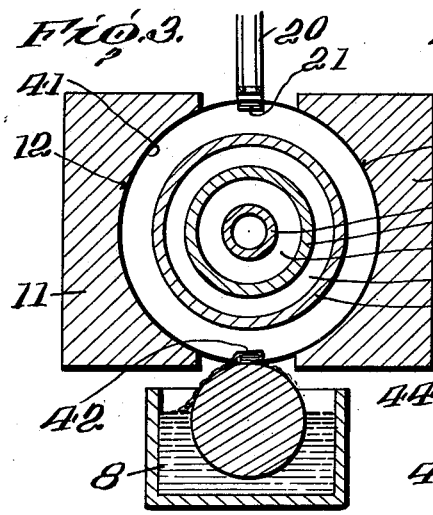
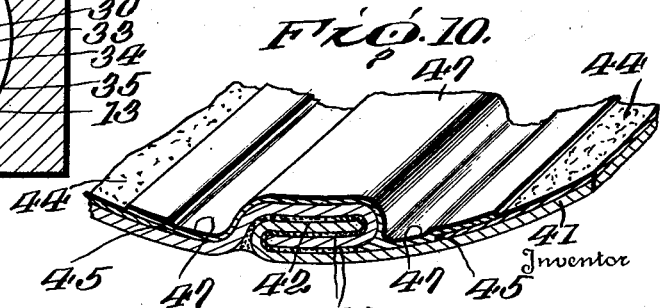

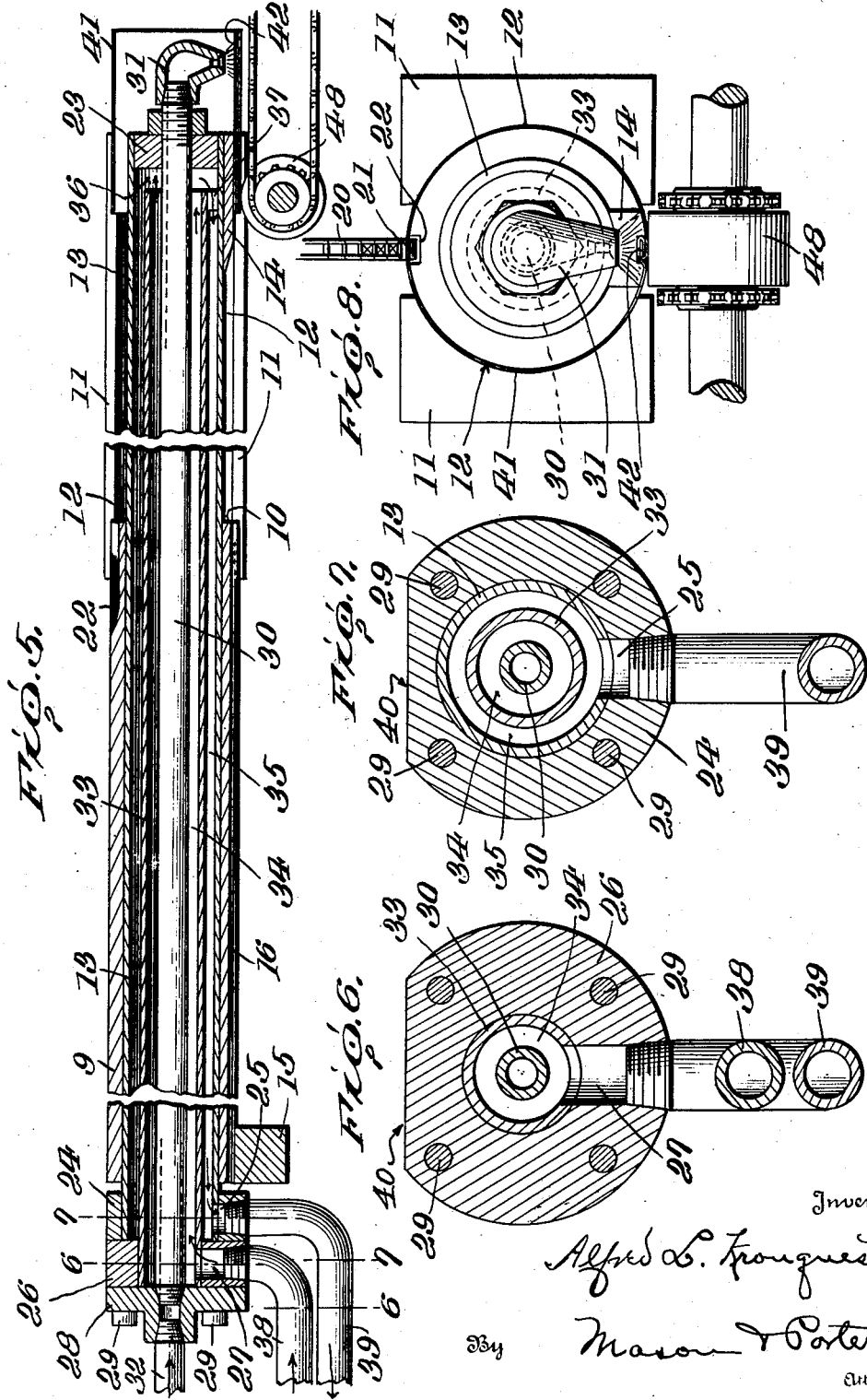

Patented July 18, 1939

2,166,598

UNITED STATES PATENT OFFICE 2,166,598

APPARATUS FOR SOLDERING AND COATING SIDE SEAMS OF SHEET METAL CONTAINERS

Alfred L. Kronquest, Syracuse, N. Y., assignor to Continental Can Company, Inc., New York, N. Y., a corporation of New York Application July 12, 1937, Serial No. 153,272

4 Claims. (Cl. 113—60)

The invention resides in the provision of a novel apparatus for coating side seams interiorly of cans and which includes a novel combination horn and guide device, body shaping, seam bumping and seam soldering means, a spray head for applying a stripe of protective coating material to the seam interiorly of the can bodies, means for feeding and controlling the position of the can bodies to present the seams thereof to the spray head, and means for maintaining the spray material at a uniform temperature.

In the drawings:

Figure 1 is a somewhat diagrammatic side elevation and part longitudinal section of portions of a can body forming machine with the invention applied thereon;

Figure 2 is a vertical cross section of the forming machine taken at the shaping and bumping station;

Figure 3 is a vertical cross section taken on the line 3—3 on Figure 1;

Figure 4 is a vertical cross section taken on the line 4—4 on Figure 1;

Figure 5 is a longitudinal section taken through the horn and spraying equipment;

Figures 6 and 7 are vertical cross sections taken respectively on the lines 6—6 and 7—7 on Figure 5;

Figure 8 is a right end elevation of the horn and spraying equipment; and

Figures 9 and 10 are detail perspective views respectively illustrating can seam portions before and after the spray-striping thereof.

Can body forming machines are well known and usually include a forming horn, means for feeding body blanks or sheets laterally or longitudinally to the horn, means for shaping the blanks about the horn and for longitudinally seaming the bodies and bumping the seams, means for feeding the formed bodies along the horn, and means for solder-bonding the longitudinal body seams. All such devices are shown in detail in prior patents of which Troyer 1,772,820 of August 12, 1930, is an example, and they, of themselves, form no part of the present invention except insofar as they form supporting elements in novel combinations hereinafter to be described.

In the practical development of the invention the body blanks may be fed to the forming devices in the manner shown in the Troyer patent or in any approved manner. The body shaping devices herein generally designated 5, the bumping means 6, and the oscillating arm 7 by which movement is transmitted to the formed body feeding means may be constructed and operated generally as shown in the Troyer patent, and a seam bonding or soldering means 8 of the roll or any other approved type may be employed.

A special type of horn has been devised which serves not only to aid in the shaping of the bodies, and to support and guide their progress through a portion of the machine, but also to support the spraying equipment and to house special means for maintaining the spraying material at a desirable uniform temperature.

This horn includes an outer cylindrical shell 9 on which the can bodies are shaped, and which extends a distance beyond the forming zone to a point 10 at which it guides the can bodies into the outside solder horn 11 comprising a pair of spaced members having half-cylindrical internal can body supporting and guiding surfaces 12. The unit 11 guides the formed can bodies through the solder bonding station of the machine at which the soldering equipment 8 is located.

A hollow tubular conduit member 13 is supported in the horn shell 9 and extends from both ends thereof. From the delivery end of the horn shell 9 the conduit member 13 extends through and to the end of the outside solder horn 11, its external surface being spaced inwardly from the guiding surfaces 12 of said horn, and at its extended end it carries an enlargement or stripper wheel opposing member 14.

The horn shell 9 is suitably supported as at 15 and is equipped along its under surface with a grooveway 16 to receive the can body seams and by this means guide and control progress of the can bodies along the horn shell so as to prevent lateral or rotational displacement of said seams. The can bodies may be fed along the horn shell by finger bars 17 reciprocable in grooveways 18 provided therefor in said shell and connected at their ends by a yoke 19 with the oscillatable arm 7.

After the bars 17 have fed the can bodies the length of the shell 9, the feeding of said bodies is taken over by a conveyor chain 20 having grip-slotted fingers 21 depending therefrom for gripping and feeding the can bodies. The shell 9 is provided with a clearance 22 to allow the fingers 21 to take control of the can bodies. It will be observed by reference to Figures 1 and 5 that the chain fingers 21 grip the edges of the can bodies and take control before the seam grooveway 16 relinquishes control, and thus the can bodies remain under control, held against movement about their axes, until presented to the spraying devices soon to be described.

At its outer end the conduit member 13 carries a closure wall or plug 23, and at its inner end it is surrounded by a collar 24 having an outlet port 25 therein. At its inner end the conduit member is closed by a collar 26 having an inlet port 27 therein and being opposed by an end cap member 28 which is secured thereto, and to the collar 24, by screws 29. The plug 23 and the end cap 28 are centrally bored to receive and support a spray pipe 30, the outer end of which is extended beyond the wall 23 and equipped with a spray nozzle 31 directed toward the can seam as shown in Figures 1, 5, and 8. This spraying material, preferably lacquer, is fed to the spray pipe 30 through a supply pipe line 32 from a suitably controlled source (not shown).

The collar 26 supports a tubular division wall member 33 which is spaced outwardly from the spray pipe 30 and inwardly from the conduit member 13 so as to provide an inner cooling fluid flow space 34 and an outer cooling fluid return space 35. The outer, free end of the member 33 is spaced from the end wall 23, as at 36, so as to afford communication between the spaces 34 and 35, and said end is suitably supported in spaced relation to the conduit 13 and the pipe 30 as indicated at 37.

Flow and return pipes 38 and 39 are connected with the ports 27 and 25 communicating with the respective spaces 34 and 35 and serve to circulate water, or any other suitable cooling fluid, through said spaces for the purpose of maintaining the lacquer flowing through the spray pipe 30 at the desired uniform temperature.

The members 24, 26 and 28 preferably are flattened, as indicated at 40 in Figures 6 and 7, so that they will not interfere with the feeding in of the can body blanks when the longitudinal type of feed is employed.

In Figures 9 and 10 I have illustrated portions of can seams before and after spray-striping. The can body is indicated at 41, the seam at 42, and the solder-bonding at 43. The body is shown as internally lacquer-coated as at 44, with the coating terminating at 45, just short of the seam, leaving bare metal spaces 46. My improved protective stripe or coating, for protecting beverages against free contact with the bare metal seam 42 and spaces 46 and the solder 43, is indicated at 47.

In the practical use of my improved apparatus, the can bodies are shaped, seamed and bumped on the shell 9 after the well known practice. The formed can bodies 41 are fed along the shell 9 by the finger bars 17, controlled as to position or guided by contact of the seams 42 in the grooveway 16. Before the cans pass off onto the conduit member 13, or rather into the outside horn 11, and beyond the control of the grooveway 16, they are engaged and gripped by one of the feed fingers 21 of the chain 20 so that control of the position of the can bodies remains constant.

The chain fingers 21 retain control of the can bodies as they are fed along through the solder-bonding station and until the spray nozzle 31 is reached, thus assuring application of the protective stripe directly over the seam as shown in Figures 8 and 10.

As the can bodies are passing to the spray zone they pass under the depending enlargement member 14 and over a stripping roll 48 disposed in opposed relation thereto. The surface speed of the roll 48 is greater than the speed of movement of the fingers 21 and the can bodies are thus stripped from the fingers and deposited onto conveyor chains 49 to be conveyed to and through suitable cooling means (not shown).

During the seam spraying operation, cooling fluid is constantly circulated through the inlet and outlet conduits or spaces 34 and 35 and the lacquer is thus maintained at the desired uniform temperature.

I claim:

1. An apparatus for solder bonding and lacquering the side seam of a can body comprising a horn, a solder applying means for applying solder to the outer face of the side seam, and a lacquer applying means for applying a stripe of lacquer to the inner face of the can body in the region of the side seam, and means for presenting the side seam of the can body in succession to the solder applying means and the lacquer applying means, said lacquer applying device including a lacquer supply pipe extending longitudinally through said horn from one end thereof to the other, and means for cooling said lacquer supply pipe from the heat of the solder applying means.

2. An apparatus for solder bonding and lacquering a side seam of a can body comprising a horn, a solder applying means disposed intermediate the ends of the horn for applying solder to the outer face of the side seam, a lacquer supply means disposed at the delivery end of said horn for applying a stripe of lacquer to the inner surface of the can body in the region of the side seam, and means for presenting the side seam of the can body in succession to the solder applying means and the lacquer applying means, said lacquer supply device including a supply pipe extending longitudinally through said horn from one end thereof to the other, and means for cooling said lacquer supply pipe from the heat of the solder applying means.

3. An apparatus for solder bonding and lacquering a side seam of a can body comprising a horn, a solder applying means disposed intermediate the ends of the horn for applying solder to the outer face of the side seam, a lacquer supply means disposed at the delivery end of said horn for applying a strip of lacquer to the inner surface of the can body in the region of the side seam, and means for presenting the side seam of the can body in succession to the solder applying means and the lacquer applying means, said lacquer supply device including a supply pipe extending longitudinally through said horn from one end thereof to the other, and means surrounding the lacquer supply pipe through which a cooling fluid may be directed for protecting the lacquer from the heat of the solder applying means.

4. An apparatus for solder bonding and lacquering a side seam of a can body comprising a horn, a solder applying means disposed intermediate the ends of the horn for applying solder to the outer face of the side seam, a lacquer supply means disposed at the delivery end of said horn for applying a stripe of lacquer to the inner surface of the can body in the region of the side seam, and means for presenting the side seam of the can body in succession to the solder applying means and the lacquer applying means, said lacquer supplying device including a pipe extending longitudinally through said horn from one end thereof to the other, a sleeve surrounding said pipe in the region of the solder applying means, a second sleeve surrounding the first-named sleeve, said sleeves forming cooling chambers connected at the ends thereof adjacent the lacquer supplying devices, and means whereby a cooling fluid can be circulated through said chambers for protecting the lacquer from the heat of the solder applying means.

ALFRED L. KRONQUEST.